(12) United States Patent
Kuchi

(10) Patent No.: US 10,374,843 B2
(45) Date of Patent: Aug. 6, 2019

(54) METHOD AND SYSTEM FOR DESIGNING A WAVEFORM FOR DATA COMMUNICATION

(71) Applicant: INDIAN INSTITUTE OF TECHNOLOGY HYDERABAD, Sangareddy (IN)

(72) Inventor: Kiran Kumar Kuchi, Hyderabad (IN)

(73) Assignee: INDIAN INSTITUTE OF TECHNOLOGY HYDERABAD, Kandi, Sangareddy (IN)

( * ) Notice: Subject to any disclaimer, the term of this patent is extended or adjusted under 35 U.S.C. 154(b) by 0 days.

(21) Appl. No.: 15/557,956

(22) PCT Filed: Jul. 16, 2015

(86) PCT No.: PCT/IB2015/055381
§ 371 (c)(1),
(2) Date: Sep. 13, 2017

(87) PCT Pub. No.: WO2016/174508
PCT Pub. Date: Nov. 3, 2016

(65) Prior Publication Data
US 2018/0054332 A1 Feb. 22, 2018

(30) Foreign Application Priority Data
Apr. 29, 2015 (IN) .......................... 2196/CHE/2015

(51) Int. Cl.
*H04L 25/03* (2006.01)
*H04L 27/20* (2006.01)
*H04B 1/02* (2006.01)
*H04L 27/26* (2006.01)

(52) U.S. Cl.
CPC .... *H04L 25/03834* (2013.01); *H04L 27/2003* (2013.01); *H04L 27/2082* (2013.01); *H04B 1/02* (2013.01); *H04L 27/2014* (2013.01); *H04L 27/2636* (2013.01)

(58) Field of Classification Search
CPC .......... H04L 25/03834; H04L 27/2003; H04L 27/2014; H04L 27/2636; H04B 1/02
See application file for complete search history.

(56) References Cited

U.S. PATENT DOCUMENTS

2016/0182270 A1\* 6/2016 Jungnickel ........ H04L 25/03828
375/260

\* cited by examiner

*Primary Examiner* — David S Huang

(57) ABSTRACT

Embodiments herein disclose a method and system for designing a waveform for data communication. The method includes applying, by a phase rotation applying unit, a constellation specific phase rotation between consecutive data symbols in a data stream to obtain a constellation rotated data stream. Further, the method includes introducing, by a frequency domain pulse shaping filter, an inter symbol interference (ISI) between modulated data symbols of the constellation rotated data stream, such that the ISI develops the waveform of the constellated rotated data stream to be transmitted.

24 Claims, 11 Drawing Sheets

METHOD AND SYSTEM FOR DESIGNING A WAVEFORM FOR DATA COMMUNICATION

FIELD OF INVENTION

The present invention relates to wireless communication techniques, and more particularly to a method and system for designing a waveform for data communication. The present application is a National Phase Application for PCT application No. PCT/IB2015/055381 based on, and claims priority to Indian Application Number 2196/CHE/2015 filed on 29 Apr. 2015, the disclosure of which is hereby incorporated by reference.

BACKGROUND OF INVENTION

An Orthogonal Frequency Division Multiplexing (OFDM) technique has emerged as a dominant modulation technique for wide area cellular applications. However, the fifth generation (5G) wireless standards are expected to support high data rate wide area cellular systems as well as low data rate applications involving machine-to-machine communications (M2M), machine type communications (MTC)-popularly known as internet of things (IoT). The physical layer of 5G IoT has diverse requirements such as support for large coverage area, high power amplifier efficiency for increased battery life, support for ultra-low latencies at physical layer level, support of massive number of low throughput devices and very low out of band emissions (OBE). The Low OBE is mainly required for situations where a system uses dynamic spectrum access principles or for cognitive radio techniques.

The OFDM has very high peak-to-average-power ratio (PAPR), high OBE compared to single carrier systems. Filter bank multicarrier (FBMC) and generalized frequency division multiplexing (GFDM) has been proposed as an alternative to OFDM. Though Discrete Fourier transform (DFT)-pre-coded-OFDM employing a square root raised cosine (SQRC) frequency domain pulse shaping filter (FDPSF) with certain excess bandwidth (BW) was proposed in to reduce the peak to average power ratio (PAPR), the fourth generation (4G) Long-Term-Evolution (LTE) uplink employed a rectangular FDPSF for bandwidth efficiency reasons.

Therefore, there is a need for proposing a DFT-pre-coded-OFDM and develop a waveform that offers significantly lower PAPR compared to existing OFDM based techniques.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method and system for designing a waveform for data communication.

Another object of the invention is to provide a mechanism for applying a constellation specific phase rotation between consecutive data symbols in a data stream to obtain a constellation rotated data stream.

Another object of the invention is to provide a mechanism for introducing an inter symbol interference (ISI) between modulated data symbols of the constellation rotated data stream.

Another object of the invention is to provide a mechanism for applying a window function on the data stream.

Accordingly the invention discloses a method for designing a waveform for data communication. The method includes applying, by a phase rotator, a constellation specific phase rotation between consecutive data symbols in a data stream to obtain a constellation rotated data stream. Further, the method includes introducing, by a frequency domain pulse shaping filter, an inter symbol interference (ISI) between modulated data symbols of the constellation rotated data stream, such that the ISI develops the waveform of the constellated rotated data stream to be transmitted.

Accordingly the invention discloses a method for processing a received data stream. The received data stream is in a form of waveform designed by a frequency domain pulse shaping filter. The method includes receiving, by a receiving unit, the data stream. The data stream comprises an inter-symbol interference (ISI) between modulated data symbols, of the data stream, introduced by the frequency domain pulse shaping filter. Further, the method includes suppressing, by a vector/matrix-valued filter, the ISI between the modulated data symbols in the data stream. Furthermore, the method includes converting, a converting unit, the received data stream to time domain for detection of a signal after suppressing the ISI.

Accordingly the invention provides a transmitter for designing a waveform for data communication. The transmitter includes a phase rotator configured to apply a constellation specific phase rotation between consecutive data symbols in a data stream to obtain a constellation rotated data stream. A frequency domain pulse shaping filter is configured to introduce an inter symbol interference (ISI) between modulated data symbols of the constellation rotated data stream, such that the ISI develops the waveform of the constellated rotated data stream to be transmitted.

Accordingly the invention provides a receiver for processing a received data stream. The received data stream is in a form of waveform designed by a frequency domain pulse shaping filter. The receiver includes a receiving unit configured to receive the data stream. The data stream comprises an inter-symbol interference (ISI) between modulated data symbols, of the data stream, introduced by the filter. A vector/matrix-valued filter is configured to suppress the ISI between the modulated data symbols in the data stream. A converting unit is configured to convert the received data stream to time domain for detection of a signal after suppressing the ISI.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
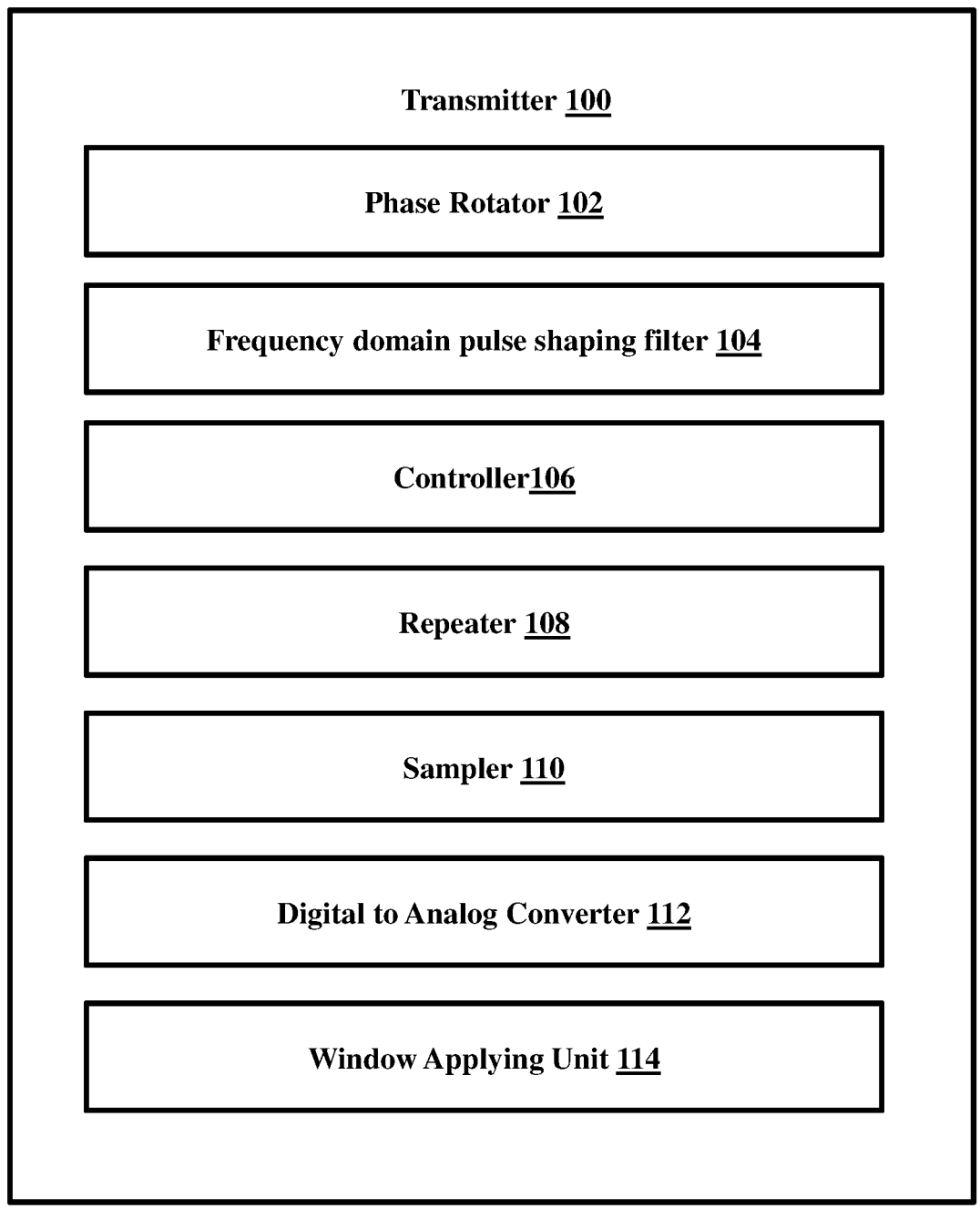
FIG. 1 is a block diagram of various hardware components present in a transmitter configured for designing a waveform for data communication, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method and system for designing a waveform for data communication. The method includes applying, by a constellation specific phase rotator, a constellation specific phase rotation between consecutive data symbols in a data stream to obtain a constellation rotated data stream. Further, the method includes introducing, by a frequency domain pulse shaping filter (FDPSF), an inter symbol interference (ISI) between modulated data symbols of the constellation rotated data stream, such that the ISI develops the waveform of the constellated rotated data stream to be transmitted.

Unlike conventional systems, the proposed method can design the waveforms with very low peak-to-average-power-ration (PAPR) and small bit error rate (BER) penalty.

The embodiments herein achieve a method and receiver for processing a received data stream. The received data stream is in a form of waveform designed by a frequency domain pulse shaping filter. The method includes receiving, by a receiving unit, the data stream. The data stream comprises an inter-symbol interference (ISI) between modulated data symbols, of the data stream, introduced by the frequency domain pulse shaping filter. Further, the method includes suppressing, by a vector/matrix-valued filter, the ISI between the modulated data symbols in the data stream. Furthermore, the method includes converting, a converting unit, the received data stream to time domain for detection of a signal after suppressing the ISI.

The proposed method can mitigate the ISI and self-interference caused by the FDPSF. The proposed method implements conventional and widely linear frequency domain multi-user user equalization techniques to mitigate the ISI and self-interference introduced by the FDPSF.

Unlike conventional systems, the proposed frequency domain multi-user user equalizer performs both ISI and self-interference mitigation jointly with low-implementation complexity. The proposed GMMSE type of receiver exploits the redundancy in the frequency domain signal structure introduced by the FDPSG and therefore leads to very efficient multi-user frequency domain equalizer.

Referring now to the drawings and more particularly to FIGS. 1 through 9, where similar reference characters denote corresponding features consistently throughout the figure, there are shown preferred embodiments.

FIG. 1 is a block diagram of various hardware components present in a transmitter 100 configured for designing a waveform for data communication, according to the embodiments as disclosed herein. The transmitter 100 includes a phase rotator 102, a frequency domain pulse shaping filter 104, a controller 106, a repeater 108, a sampler 110, a digital to analog converter 112, and a window applying unit 114. The phase rotator 102 is configured to apply a constellation specific phase rotation between consecutive data symbols in a data stream to obtain a constellation rotated data stream. The frequency domain pulse shaping filter 104 is configured to introduce an inter symbol interference (ISI) between modulated data symbols of the constellation rotated data stream, such that the ISI develops the waveform of the constellated rotated data stream to be transmitted. The frequency domain pulse shaping filter 104 is configured to shape a spectrum of a spread signal, when the sampling factor is one or more than one.

The controller 106 is configured to compute the multi-point Discrete Fourier Transform (DFT) of the constellation rotated data stream. After computing the multi-point DFT of the constellation rotated data stream, the repeater 108 is configured to repeat the constellation rotated data stream in a frequency domain to obtain a spread signal.

In an embodiment, the sampler 110 is configured to sample a linearized Gaussian pulse using an over-sampling factor. In an embodiment, the over-sampling factor is one. In another embodiment, the over-sampling factor is greater than one. After sampling the linearized Gaussian pulse, the controller 106 is configured to compute a multi-point two-sided DFT of the sampled linearized Gaussian pulse to obtain the frequency domain pulse shaping filter.

In an embodiment, the data stream is mapped to a localized subcarrier after introducing the ISI between the data symbols of the data stream. In another embodiment, the data stream is mapped to a distributed sub-carrier.

The controller 106 is configured to add a cyclic prefix, a cyclic suffix or combination of both to the data stream after performing an inverse discrete Fourier transform (IDFT) on the data stream. In another embodiment, the controller 106 is configured to add the cyclic prefix, the cyclic suffix or combination of both to the data stream after performing an Inverse Fast Fourier Transform (IFFT) on the data stream. After adding the cyclic prefix, the cyclic suffix or combination of both to the data stream, the digital to analog converter 112 is configured to convert the data stream from the digital signal to the analog signal.

After adding the cyclic prefix or the cyclic suffix or combination of cyclic prefix and the cyclic suffix to the data stream, the window applying unit 114 is configured to apply the window function on the data stream.

The proposed transmitter 100 utilizes a time domain signal representation that is distinct from the DFT-precoded-OFDM. The proposed transmitter 100 utilizes the DFT-precoded-OFDM techniques that allow certain amount of self-interference among the users through orthogonal/non-orthogonal subcarrier mapping. The proposed transmitter 100 allows the users to have unequal bandwidth, while prior-art GFDM does not permit this scenario.

Unlike conventional system, the transmitter 100 can implement FDPS techniques that introduce a controlled amount of ISI between modulation data symbols for reducing the PAPR. In the special case of binary modulation, the transmitter 100 can apply constellation rotation of 90-degrees between consecutive data symbols of the user followed by DFT precoding, user specific frequency domain spreading, and frequency domain subcarrier level pulse shaping filtering.

The following operation and function explains the design and functioning of transmitter 100 for designing the waveform in detail:

In an embodiment, the transmitter 100 can be configured to design the waveform for a single user case. The transmitter sends a block of M i.i.d real/complex valued modulation alphabets with zero-mean and variance $\sigma^2$. Let $a_t(l)$ denote the modulation data. Here, the transmitter 100 can apply a constellation specific phase rotation $\theta(l)$ to obtain: $x_t(l)=e^{j\theta(l)}a_t(l)$. The DFT preceding of the data stream $x_t(l)$ is accomplished using a M-point DFT as $$x(k) = \sum_{l=0}^{M-1} x_t(l)e^{\frac{-j2\pi lk}{M}} \quad k = 0, \ldots, M-1 \tag{1}$$

where l, k denote the discrete time and subcarrier indices, respectively, and $x(M+k)=x(k)$. Alternative to (1), a two sided DFT can be taken as:

$$x(k) = \sum_{l=-\frac{M}{2}}^{\frac{M}{2}-1} e^{j\theta_t(l)} x_{i,t}(l) e^{\frac{-j2\pi lk}{M}} \quad \frac{-M}{2} \le k \le \frac{M}{2}-1$$

Consider a L fold periodic extension of x(k) where $$\tilde{x}(m) = x\left(\left(\left(m + \frac{LM}{2}\right) \bmod M\right) + 1\right).$$

Here, the elements of the vector $\tilde{x}(m)$ take the range $$m = -\frac{LM}{2}, \ldots, \frac{LM}{2} - 1$$

and ML=N, N being total number of used subcarriers. In time domain, $$\tilde{x}_t(n) = x_t\left(\frac{n}{L}\right)$$

for n=pL where p=0, 1, . . . , M−1 and $\tilde{x}_t(n)=0$ elsewhere and $$n = -\frac{N}{2}, \ldots, \frac{N}{2} - 1.$$

Here $$x_t(l) = \tilde{x}_t\left(lL - \frac{N}{2}\right)$$

for l=0, . . . , M−1. Let $$\tilde{x}(m) = \sum_{n=-\frac{N}{2}}^{\frac{N}{2}} \tilde{x}_t(m)e^{\frac{-2\pi nm}{N}} \quad m = \frac{-N}{2}, \ldots, \frac{N}{2} - 1 \tag{2}$$

$$= \sum_{l=0}^{M-1} x_t(l)e^{\frac{-j2\pi(lL-\frac{N}{2})m}{N}} \tag{3}$$

$$= e^{j\pi m}\sum_{l=0}^{M-1} x_t(l)e^{\frac{-j2\pi lLm}{N}} \tag{4}$$

The DFT operation in (1) can also be implemented as a two-sided DFT with l in the range $$\left[\frac{-M}{2}, \ldots, \frac{M}{2} - 1\right][(-M)/2 \ldots M/2 - 1].$$

Alternatively, swap the left and right halves of x(k) with zero frequency component in the middle. Now consider a frequency domain pulse shaping filter:

$$q(m) = \sum_{n=-\frac{N}{2}}^{\frac{N}{2}-1} q_t(n)e^{\frac{-j2\pi nm}{N}}, \quad m = -\frac{N}{2}, \ldots, \frac{N}{2} - 1 \tag{5}$$

Where $q_t(n)$ are the samples of the time domain pulse shaping filter. Please note that, q(m) may take zero values for certain subcarriers. Alternatively, all N subcarriers need not be modulated with data. In some cases, some subcarriers at band edges may be nulled out. Applying the pulse shape to the transmitted data $\tilde{x}(m)$, the proposed method has: $x_q(m)=q(m)\tilde{x}(m)$. The time domain baseband signal $s(t)$ is obtained using an inverse discrete time Fourier transform (IDFT).

$$s(t) = \frac{1}{N} \sum_{m=-\frac{N}{2}}^{\frac{N}{2}-1} q(m)\tilde{x}(m)e^{j2\pi m\Delta f(t-T_{CP})}, \; t \in [0, T+bT] \quad (6)$$

where T is the useful portion of OFDMA symbol, $T_{CP}$ is the duration of the cyclic prefix (CP) and $\Delta f=1/T$ is the subcarrier spacing. Note that b=1 when the system uses CP only and b=2 when the system uses cyclic prefix as well as cyclic suffix. Using (4) and (5), the analog signal can be rewritten as $$s(t) = \frac{1}{N} \sum_{m=-\frac{N}{2}}^{\frac{N}{2}-1} e^{j\pi m} q(m)\tilde{x}(m)e^{j2\pi m\Delta f(t-T_{CP})}, \; t \in [0, T+bT] \quad (7)$$

$$= \frac{1}{N} \sum_{l=0}^{M-1} x_l(l) \sum_{m=-\frac{LM}{2}}^{\frac{LM}{2}-1} q(m)e^{j2\pi m\left(\frac{1}{T}(t-T_{CP})-\frac{lL}{N}+\frac{1}{2}\right)} \quad (8)$$

$$= \frac{1}{N} \sum_{l=0}^{M-1} e^{j\Theta(l)} a_l(l) q_P\left(t - T_{CP} - \frac{lL}{M} + \frac{T}{2}\right) \quad (9)$$

where $$q_P(t) = \sum_{m=-\frac{N}{2}}^{\frac{N}{2}-1} q(m)e^{j2\pi m\frac{t}{T}}$$

and $t\in[0,T+bT]$ is the time domain pulse shaping function and $x_l(l)=e^{j\Theta(l)}a_l(l)$. Note that $q_P(t)=q_P(t+rT)$, r being an integer. The transmitter 100 sends successive data blocks serially where each data block is limited to duration of $T+bT_{CP}$ seconds. Here, the time domain signal has a form similar to conventional SC-FDMA with $q(t)$ being the pulse shaping function.

In another embodiment, let us consider the multiple access scenarios. In this scenario, the number of users shares the available bandwidth simultaneously. Therefore, the both non-orthogonal and orthogonal user allocations may be considered, where the users may employ distinct pulse shapes with different bandwidth requirements. Assuming there are a total of u users, let us denote the data of the $i^{th}$ user with $x_i(k)$ where $$x_i(k) = \sum_{l=0}^{M_i-1} e^{j\theta_l(l)} x_{i,t}(l) e^{\frac{-j2\pi lk}{M_i}}, \; k = 0, \ldots, M_i - 1 \quad (10)$$

where $M_i$ is the data length of the $i^{th}$ user, $\theta_i(l)$ being the constellation rotation employed by the $i^{th}$ user data $x_{i,t}$. Note that the DFT operation in (10) can be implemented using a two sided DFT as $$x_i(k) = \sum_{l=-\frac{M_i}{2}}^{\frac{M_i}{2}-1} e^{j\theta_l(l)} x_{i,t}(l) e^{\frac{-j2\pi lk}{M_i}}, \; \frac{-M_i}{2} \le k \le \frac{M_i}{2} - 1$$

Let $\tilde{x}_i(m)$ denote the $L_i$ fold periodic extension of $x_i(k)$ where $L_iM_i=N$ and let $q_i(l)$ be the FDPSF associated with this user that is defined as $$q_i(m) = \sum_{n=-\frac{N}{2}}^{\frac{N}{2}-1} q_{i,t}(n) e^{\frac{-j2\pi mn}{N}}, \; \text{for } m = -\frac{\overline{M}_i}{2}, \ldots, \frac{\overline{M}_i}{2} - 1 \quad (11)$$

$$= 0 \; \text{elsewhere} \quad (12)$$

where, $q_{i,n}(t)$ are the corresponding time domain samples. Note that the FDPSF takes non-zero values over $\overline{M}_i$ subcarriers where $\overline{M}_i-M_i$ is the excess number of subcarriers employed for the $i^{th}$ user. In this case, $(\overline{M}_i-M_i)\Delta f$ is denoted as the excess bandwidth employed by the $i^{th}$ user. Further, the users are frequency multiplexed over the given the band of interest as $$s_i(t) = \frac{1}{N} \sum_{m=-\frac{N}{2}}^{\frac{N}{2}-1} q_i(m-m_i)\tilde{x}_i(m)e^{j2\pi\Delta f(t-T_{CP})}, \quad (13)$$

$$t \in [0, T + bT_{CP}]$$

where $m_i$ is the frequency shift of the $i^{th}$ user. The proposed method provides a non-orthogonal multicarrier signal, if the values of $m_i$ are set to integer multiples of $\overline{M}_i$.

In an embodiment, the proposed method $$choose s m_i = (i-1)M_i - \frac{N - \overline{M}_i}{2}$$

for i=1, 2, . . . , $u_i$. In another embodiment, the values of $m_i$ are chosen based on the subcarrier mapping procedure employed by the transmitter 100.

The transmitted signal can be represented in an alternative form as $$s_i(t) = \frac{1}{N} \sum_{l=0}^{M_i-1} e^{j\theta(l)} a_{i,t}(l) q_{i,p}\left(t - T_{CP} - \frac{lT}{M_i} + \frac{T}{2}\right), \quad (14)$$

$$t \in [0, T + bT_{CP}]$$

Where $$q_{i,p}(t) = \sum_{m=-\frac{N}{2}}^{\frac{N}{2}-1} q_i(m-m_i) e^{j2\pi m\frac{t}{T}}$$

is the time domain pulse shaping function employed by the $i^{th}$ user. Here, $q_{i,p}(t)=q_{i,p}(t+rT)$, where r is an integer.

let $$q_{i,p}(t) = \sum_{m=\frac{-N}{2}}^{\frac{N}{2}-1} q_i(m-m_i)e^{j2\pi m \frac{t}{T}} \quad t \in [0, T+bT_{CP}] \quad (15)$$

Using (11) and substituting $m-mi=m1$ in (15) to express $q_i(t)$ in alternative form as $$q_{i,p}(t) = e^{j2\pi m_i \frac{t}{T}} \sum_{m=\frac{-M_i}{2}}^{\frac{M_i}{2}-1} q_i(m)e^{j2\pi m \frac{t}{T}} \quad (16)$$

$$= q_{0,i}(t)e^{-j2\pi m_i \frac{t}{T}} t \in [0, T+bT_{CP}] \quad (17)$$

and $$q_{0,i}(t) = \sum_{m_1=\frac{-M_i}{2}}^{\frac{M_i}{2}-1} q_i(m_1)e^{j2\pi m \frac{t}{T}}$$

is the baseband pulse shaping function used by the $i^{th}$ user. Now the transmitted signal may be rewritten as:

$$s_i(t) = \frac{1}{N} \sum_{l=0}^{M_i-1} e^{j\theta_i(l)} a_{i,l}(l) q_{0,i}\left(t - T_{CP} - \frac{lT}{M_i} + \frac{T}{2}\right) e^{j2\pi m_i \frac{\left(t-T_{CP}-\frac{lT}{M_i}+\frac{T}{2}\right)}{T}} \quad (18)$$

In an embodiment, the total number of subcarriers is N. However, only $N_u$ subcarriers out of N may be used by the transmitter 100. The remaining $(N-N_u)$ subcarriers do not carry the data. Furthermore, a number of users are frequency multiplexed over the $N_u$ subcarriers. The transmitted signal is given by $$s_i(t) = \frac{1}{Nu} \sum_m q_i(m-m_i)\tilde{x}_i(m)e^{j2\pi \Delta f(t-T_{cp})}t \in [0, T+bT_{cp}]$$

Here the transmitted signal spans over a group of subcarriers whose range is dictated by the subcarriers occupies by the signal of the $i^{th}$ user. Furthermore, the value of $m_i$ is a system design feature that can be used to control the amount of non-orthogonality introduced by the transmitter 100. The value of $m_i$ may be set to $M_i$, $\overline{M}_i$ or any other value. For example, setting the value of $m_i$ in the range $[0\ M_i]$ increases the spectrum efficiency of the system. Another alternative is to choose the value of $m_i$ in the range. $[M_i\ \tilde{M}_i]$ In certain cases, one may set the value of $m_i$ to be zero, if multiple users or signals of multiple antennas are allowed to transmit on the same time frequency resource.

Symbol Windowing:

As the transmit signal is confined to a period of one OFDM symbol duration, effectively it imposes a rectangular window function that leads to high OBE. In order to reduce OBE, the proposed techniques employ alternative time domain window functions that offer smooth transitions at the OFDM symbol boundaries. The proposed method includes a cyclic prefix as well as cyclic postfix each of duration $T_{CP}$. The analog signal can be rewritten as $$s_i(t) = \frac{1}{N} \sum_{m=-\frac{N}{2}}^{\frac{N}{2}-1} w(t)q_i(m-m_i)\tilde{x}_i(m)e^{j2\pi m \Delta f(T-T_{CP})}, \quad (19)$$

$$t \in [0, T+bT_{CP}]$$

$$= \frac{1}{N} \sum_{l=0}^{M_i-1} e^{j\theta_i(l)} a_{i,l}(l) w(t) q_{i,p}\left(t - T_{CP} - \frac{lT}{M_i} + \frac{T}{2}\right), \quad (20)$$

$$t \in [0, T+bT_{CP}]$$

Where, w(t) is the proposed window function defined over the interval $t \in [0, T+bT_{CP}]$ (that is designed as the OFDM symbol block duration). The window w(t) is chosen such that it takes a constant value for the duration of the OFDM symbol that excludes cyclic prefix and suffix. The window takes a constant value during a portion of the cyclic prefix and/or suffix and it tapers to a zero value at the block boundaries. Standard time domain window functions such as SQRC, RC, Hamming, Hanning, Bartltt window can be used.

In an embodiment, the following RC window is used, where W and β are design parameters:

$$w(t) = \begin{cases} W, & |t| \le \frac{1-\beta}{2W} \\ \frac{W}{2}\left(1+\cos\left(\frac{\pi W}{\beta}\left(|t|-\frac{(1-\beta)}{2W}\right)\right)\right), & \frac{1-\beta}{2W} < |t| \le \frac{1+\beta}{2W} \\ 0, & \text{otherwise} \end{cases}$$

To avoid the dc subcarrier, the transmitted signal $s_i(t)$ is further multiplied with $e^{j\pi a\Delta f(t-T_{CP})}$ or $e^{-j\pi a\Delta f(t-T_{CP})}$ where a is real-valued number. In an embodiment a=1.

In an embodiment, the signal that is generated for multiple users over distinct (distributed) frequency resources is transmitted from the same user equipment. In this case, the low PAPR properties of the signal does not hold any more but the user will be able to transmit at a higher data rate using multiple distributed time-frequency resources.

The modulation data symbols transmitted by a user equipment is usually encoded by an error correction code such as block code, convolutional code, or a turbo code, followed by a scrambler, interleaver before mapped to the desired modulation format.

Further, the FDPSF enables the low PAPR waveform design. The PAPR can be controlled using a suitable choice of constellation rotation factor θ(l), modulation size Q and the FDPSF q(m) given in equation (5). In an embodiment, let $$\theta(l) = \frac{\pi(l-1)}{2}$$

for real constellations, and for Q-ary complex constellations such as QAM, let $$\theta(l) = \frac{\pi(l-1)}{Q}.$$

For the special case of Q=2, the waveforms may be designed with nearly constant envelope by selecting $$\theta(l) = \frac{\pi(l-1)}{2},$$

and by choosing the FDPSF based on the linearized Gaussian pulse that is obtained as the principal pulse in the PAM decomposition of a binary CPM signal with modulation index 0.5. The time domain samples of the FDPSF qt (n) can be chosen as:

$$q_t(n) = p_0(t)\big|_{t=\tau_0 + \frac{nT}{s}}$$

where p0(t) is the linearized Gaussian pulse, s is the over-sampling factor, and the factor BT controls the characteristics of the waveform, and $\tau_0$ is constant time offset, and n is an integer. Since the pulse is time limited, the values of n can be taken in the range $$\frac{-sM}{2} \leq n \leq \frac{sM}{2} - 1.$$

With an over-sampling rate of s, the Fourier transform of qt (n) is periodic with a period $$\frac{s}{T}.$$

The FDPSF with a span of sMsubcarriers is obtained by taking a sMpoint DFT of $q_t(n)$ as defined in equation (11). Alternatively, the FDPSF can be obtained by taking an sM point DFT first as $$\tilde{q}(m) = \sum_{n=0}^{sM-1} q_t(n) e^{\frac{-j2\pi nm}{sM}} \quad 0 \leq m \leq sM - 1$$

Further, the left and right halves of the DFT output can be swapped so that the zero frequency components are in the middle. Alternatively, the FDPSG can be obtained using a two sided DFT as $$q(m) = \sum_{n=\frac{-sM}{2}}^{\frac{sM}{2}-1} q_t(n) e^{\frac{-j2\pi nm}{sM}} \quad \frac{-sM}{2} \leq m \leq \frac{sM}{2} - 1$$

Since the sequence $q_t(n)$ is real-valued, in certain cases, it can be appropriately circularly shifted by certain amount before taking the DFT to make the DFT output real. Also, a FDPSF of length less than sM can be applied by truncating the FDPSF filter at both ends.

Alternative to the proposed designed procedure, one can consider a $M_0$ point DFT of $q_t(n)$ where $M_0$>sM and $$q_t(n) = p_0(t)\big|_{t=\frac{nT}{s}}$$

for $$n = -\frac{M_0}{2}, \ldots, \frac{M_0}{2} - 1,$$

then collect sM points out of $M_0$ points by decimating the DFT output to generate q(m). In yet another alternative implementation, the values of q(m) can be obtained by taking samples of p0(f) (that is the Fourier transform of p0(t) taken at appropriate intervals).

For the special case of s=1, the technique can design PDPSF without excess BW. In this case, the waveform introduces ISI but has zero multi-user interference. To obtain the time domain samples for s=1, the technique can first generate the samples corresponding to s=2, then choose either the even or odd symbol spaced sample sequence to generate the required FDPSF.

Some examples of values of time domain samples of the $q_t$ (n) is given in the Tables 1 and 2, where the pulse response is forced to be causal i.e., the values of qt (n) is positive for n≥0 and takes a zero value for n<0. In the Table the values of qt (n) start with n=0. The method defines $$\tilde{q}(m) = \sum_{n=0}^{sM-1} q_t(n) e^{\frac{-j2\pi nm}{sM}} \quad 0 \leq m \leq sM - 1$$

The FDPSF q(m) is obtained after the left and right halves of the DFT output $\tilde{q}(m)$ is swapped so that the zero frequency components are at m=0. Alternatively, considering the range 0≤n≤sM−1, the causal response qt(n) can be circularly shifted to the left by certain amount so that the zero$^{th}$ time sample is located at n=0 and negative time samples are located in the left half. In this case, the pulse response is real and symmetric i.e., $q_t(n)=q_t(sM-n)$. The DFT of this sequence is also real and symmetric i.e., $\tilde{q}(m)=\tilde{q}(sm-m)$. The FDPSF q(m) is obtained after the left and right halves of the DFT output $\tilde{q}(m)$ is swapped so that the zero frequency components in located at m=0

TABLE 1

| MSK, s = 3, $\tau_0 = 0$ | MSK, s = 3, $\tau_0 = \frac{T}{2}$ | MSK, s = 2, $\tau_0 = 0$ | MSK, s = 1, $\tau_0 = \frac{T}{2}$ |
|---|---|---|---|
| 0.5 | 0.2588 | 0.7071 | 0.7071 |
| 0.866 | 0.7071 | 1 | 0.7071 |
| 1 | 0.9659 | 0.7071 | 0 |
| 0.866 | 0.9659 | 0 | 0 |
| 0.5 | 0.7071 | 0 | 0 |
| 0 | 0.2588 | 0 | 0 |
| 0 | 0 | 0 | 0 |

TABLE-2

| BT = 0.3, L = 6, s = 2, $\tau_0 = 0$ | BT = 0.3, L = 6, s = 1, $\tau_0 = \frac{T}{2}$ | BT = 0.3, L = 6, s = 1, $\tau_0 = 0$ | BT = 0.3, L = 6, s = 1, $\tau_0 = \frac{T}{2}$ |
|---|---|---|---|
| 0.0007 | 0.0315 | 0.0007 | 0.707 |
| 0.0315 | 0.7057 | 0.2605 | 0.7071 |

TABLE-2-continued

| BT = 0.3, L = 6, s = 2, $\tau_0 = 0$ | BT = 0.3, L = 6, s = 1, $\tau_0 = \frac{T}{2}$ | BT = 0.3, L = 6, s = 1, $\tau_0 = 0$ | BT = 0.3, L = 6, s = 1, $\tau_0 = \frac{T}{2}$ |
|---|---|---|---|
| 0.2605 | 0.7057 | 0.9268 | 0 |
| 0.7057 | 0.0315 | 0.2605 | 0 |
| 0.9268 | 0 | 0.0007 | 0 |
| 0.7057 | 0 | 0 | 0 |
| 0.2605 | 0 | 0 | 0 |
| 0.0315 | 0 | 0 | 0 |
| 0.0007 | 0 | 0 | 0 |

The proposed technique can be used to multiplex data of multiple users where each user transmits an approximated continuous phase modulation (CPM) signal. The approximated CPM signal can be obtained by representing CPM a superposition of multiple PAM signals and G-DFT-precoded-OFDM modulation is applied for each PAM component. Only the dominant PAM components can be used for transmission. A corresponding receiver needs to be developed in such cases.

The principal pulse $p_0(t)$ is the main pulse in Laurent's decomposition [9] is given by $$p_0(t) = \begin{cases} \prod_{k=1}^{k=L_1} c(t-kT) t \in [0, (L_1+1)T] \\ 0 \text{ otherwise} \end{cases}$$

where $$c(t) = \begin{cases} \cos(-\frac{\pi}{2}q(t)) t \in [0, L_1 T] \\ c(-t) t \in (-L_1 T, 0] \\ 0 |t| \geq L_1 T \end{cases}$$

The pulse $q(t)$ is a Gaussian filtered rectangular pulse response defined as $$q(t) = \frac{1}{T}\left[ Q\left(\gamma\left(\frac{t}{T} - \frac{1}{2}\right)\right) - Q\left(\gamma\left(\frac{t}{T} + \frac{1}{2}\right)\right) \right]$$

where $$\gamma \cong \frac{2\pi BT}{\sqrt{(\ln(2))}},$$

BT is a parameter that controls the pulse shape, and $$Q(x) \cong \frac{1}{\sqrt{2\pi}} \int_x^\infty e^{-\frac{u^2}{2}} du.$$

The value of $L_1$ determines the pulse duration. Typically this value is chosen to be in the range 4-6.

Figure 2:
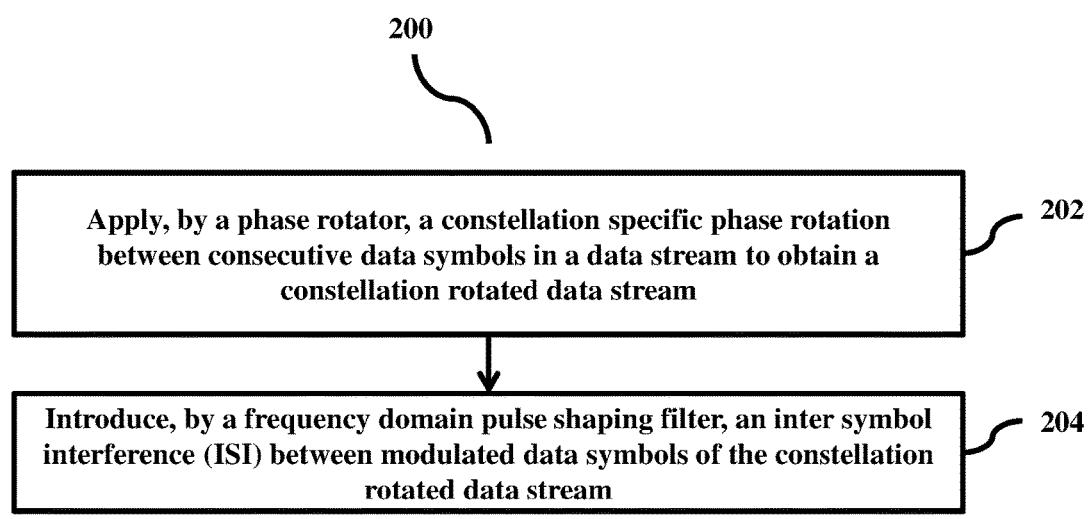
FIG. 2 is a flow diagram illustrating a method for designing a waveform for data communication, according to the embodiments as disclosed herein.

FIG. 2 is a flow diagram illustrating a method 200 for designing a waveform for data communication, according to the embodiments as disclosed herein. At the step 202, the method involves applying the constellation specific phase rotation between consecutive data symbols in the data stream to obtain the constellation rotated data stream. In an embodiment, the method 200 allows the phase rotator 102 to apply the constellation specific phase rotation between consecutive data symbols in the data stream to obtain the constellation rotated data stream.

At the step 204, the method 200 involves introducing the ISI between modulated data symbols of the constellation rotated data stream. In an embodiment, the method 200 allows the frequency domain pulse shaping filter 104 to introduce the ISI between modulated data symbols of the constellation rotated data stream.

The various actions, acts, blocks, steps, and the like in method 200 may be performed in the order presented, in a different order or simultaneously. Further, in some embodiments, some actions, acts, blocks, steps, and the like may be omitted, added, modified, skipped, and the like without departing from the scope of the invention.

Figure 3A:
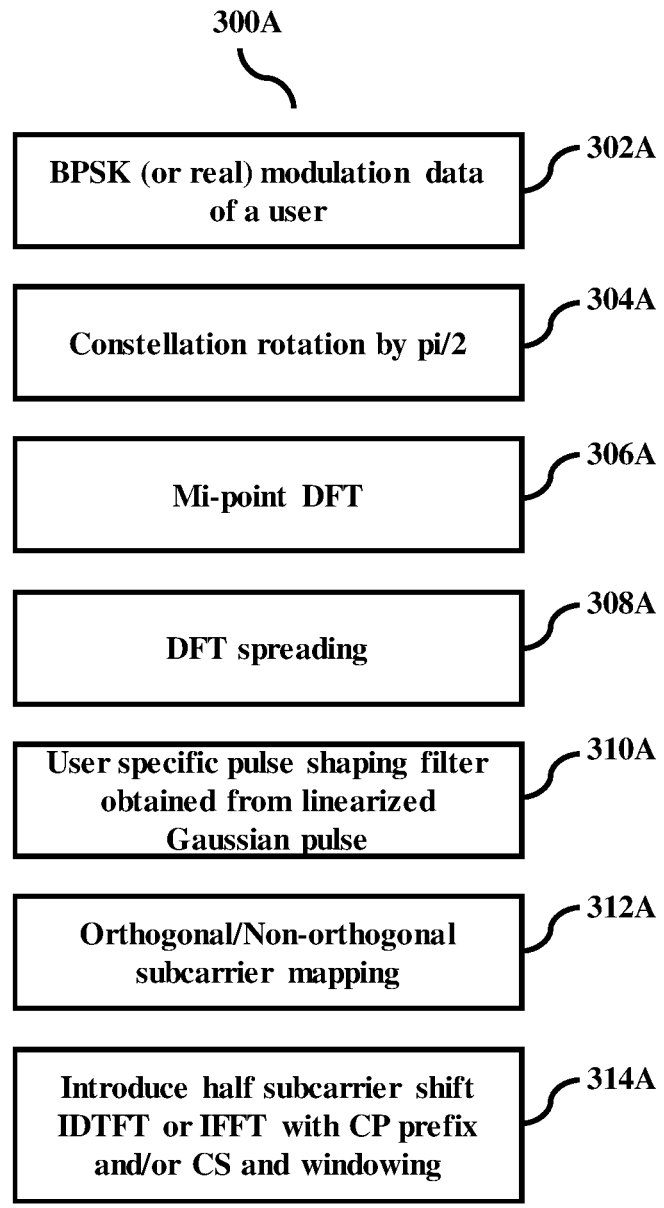
FIG. 3a shows the sequence of steps followed in generating a BPSK modulated G-DFT-pre-coded-OFDM signal with linearized Gaussian pulse shaping, according to the embodiments as disclosed herein.

FIG. 3a shows the sequence of steps followed in generating a BPSK modulated G-DFT-precoded-OFDM signal with linearized Gaussian pulse shaping. At the step 302a, the method 300a involves sending/transmitting BPSK modulation data by the transmitter 100. At the step 304a, the method 300a includes performing constellation rotation by pi/2 on the BPSK modulation data using the transmitter 100. At the step 306a, the method 300a includes performing, by the transmitter 100, Mi-point DFT after performing constellation rotation. At the step 308a, the method 300a includes performing, by the transmitter 100, DFT spreading process after performing Mi-point DFT. At the step 310a, the method 300a includes obtaining, by the transmitter 100, the user specific pulse shaping filter after performing the DFT spreading process. At the step 312a, the method 300a includes performing, by the transmitter 100, an orthogonal/Non-orthogonal subcarrier mapping after obtaining the user specific pulse shaping filter. At the step 314a, the method 300a includes introducing, by the transmitter 100, a half sub-carrier shift after performing the orthogonal/Non-orthogonal subcarrier mapping.

The various actions, acts, blocks, steps, and the like in method 300a may be performed in the order presented, in a different order or simultaneously. Further, in some embodiments, some actions, acts, blocks, steps, and the like may be omitted, added, modified, skipped, and the like without departing from the scope of the invention.

Figure 3B:
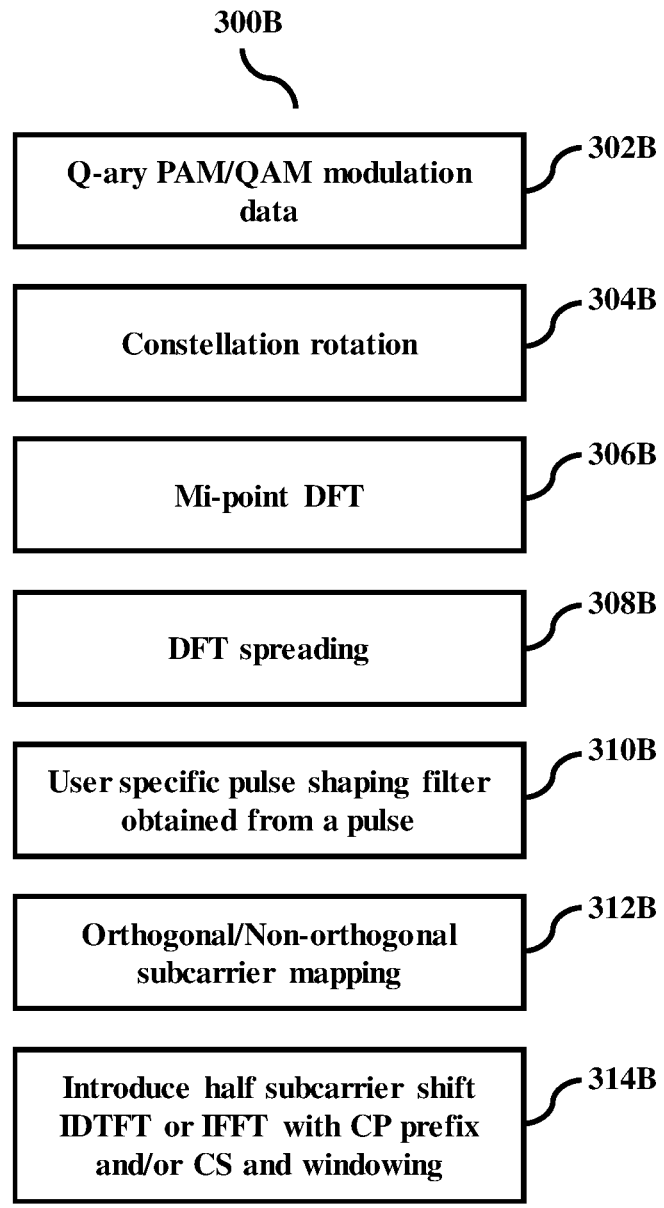
FIG. 3b shows the steps involved for designing the waveform for QAM systems with arbitrary pulse shaping filter, according to the embodiments as disclosed herein.

FIG. 3b shows the steps involved for designing the waveform for QAM systems with arbitrary pulse shaping filter. At the step 302b, the method 300b involves providing PAM or QAM modulation data by the transmitter 100. At the step 304b, the method 300b includes performing constellation rotation by pi/2 on the modulation data using the transmitter 100. At the step 306b, the method 300b includes performing, by the transmitter 100, Mi-point DFT after performing the constellation rotation. At the step 308b, the method 300b includes performing, by the transmitter 100, DFT spreading process after performing the Mi-point DFT. At the step 310b, the method 300b includes obtaining, by the transmitter 100, the user specific pulse shaping filter after performing the DFT spreading process. At the step 312b, the method 300b includes performing, by the transmitter 100, an orthogonal/Non-orthogonal subcarrier mapping after obtaining the user specific pulse shaping filter. At the step 314b, the method 300b includes introducing, by the transmitter 100, a half sub-carrier shift after performing the orthogonal/Non-orthogonal subcarrier mapping.

The various actions, acts, blocks, steps, and the like in method 300b may be performed in the order presented, in a different order or simultaneously. Further, in some embodiments, some actions, acts, blocks, steps, and the like may be omitted, added, modified, skipped, and the like without departing from the scope of the invention.

Figure 4A:
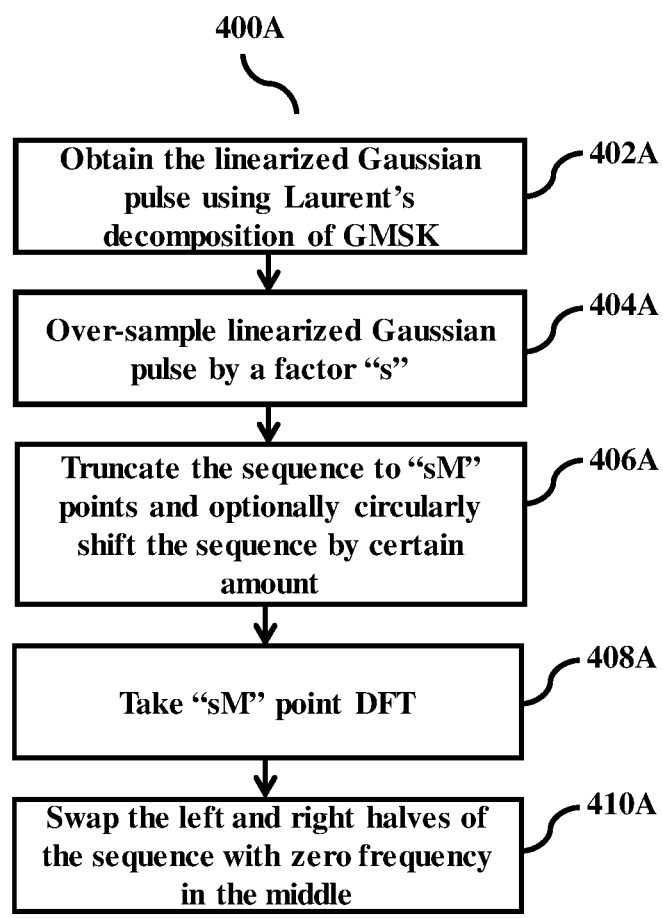
FIG. 4a shows the sequence of steps involved in the design of a frequency domain pulse shaping filter using linearized Gaussian pulse, according to the embodiments as disclosed herein.

FIG. 4a shows the sequence of steps involved in the design of a frequency domain pulse shaping filter using linearized Gaussian pulse. At the step 402a, the method includes 400a obtaining, by the transmitter 100, the linearized Gaussian pulse using Laurent's decomposition of GMSK. At the step 404a, the method includes 400a oversampling, by the transmitter 100, linearized Gaussian pulse by a factor "S" after obtaining the linearized Gaussian pulse. At the step 406a, the method includes 400a truncating, by the transmitter 100, the sequence to "sM" points and optionally circularly shifting the sequence by certain amount. At the step 408a, the method includes 400a computing "sM" point DFT. At the step 410a, the method includes 400a swapping, by the transmitter 100, the left and right halves of the sequence with zero frequency in the middle after computing "sM" point DFT.

The various actions, acts, blocks, steps, and the like in method 400a may be performed in the order presented, in a different order or simultaneously. Further, in some embodiments, some actions, acts, blocks, steps, and the like may be omitted, added, modified, skipped, and the like without departing from the scope of the invention.

Figure 4B:
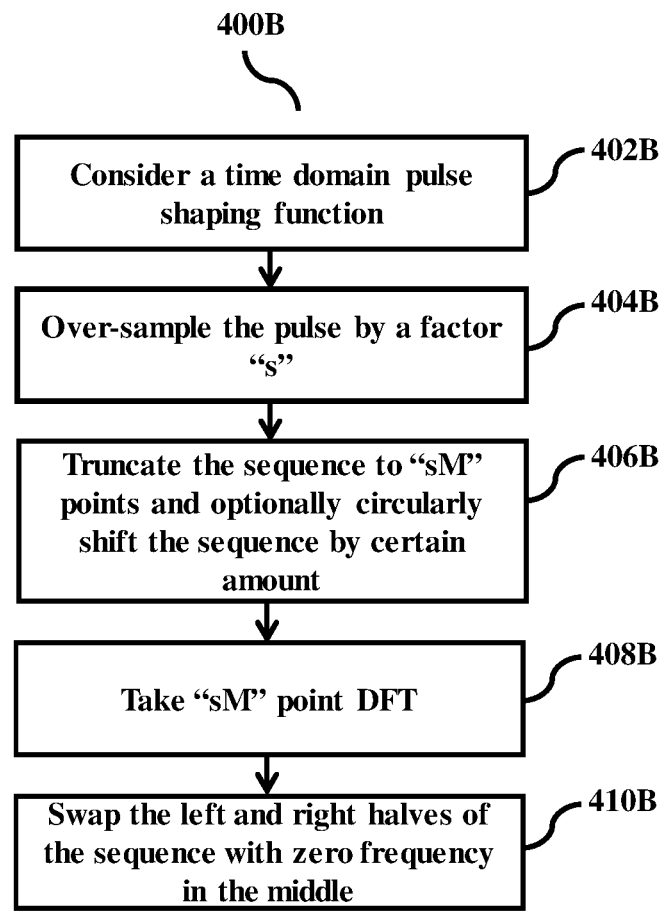
FIG. 4b shows the sequence of steps involved in the design of a frequency domain pulse shaping filter for any time domain pulse, according to the embodiments as disclosed herein.

FIG. 4b shows the sequence of steps involved in the design of a frequency domain pulse shaping filter for any time domain pulse. At the step 402b, the method includes 400b providing, by the transmitter 100, a time domain pulse shaping function. At the step 404b, the method includes 400b oversampling, by the transmitter 100, the pulse by a factor "s" after obtaining time domain pulse shaping function. At the step 406b, the method includes 400b truncating, by the transmitter 100, the sequence to "sM" points and optionally circularly shifting the sequence by certain amount. At the step 408b, the method includes 400b computing "sM" point DFT. At the step 410b, the method includes 400b swapping, by the transmitter 100, the left and right halves of the sequence with zero frequency in the middle after computing "sM" point DFT.

The various actions, acts, blocks, steps, and the like in method 400b may be performed in the order presented, in a different order or simultaneously. Further, in some embodiments, some actions, acts, blocks, steps, and the like may be omitted, added, modified, skipped, and the like without departing from the scope of the invention.

In an embodiment, the base station may schedule the users such that the users located at the cell boundaries or users with low signal-to-noise ratio use the frequency domain pulse shaping filter together with transmit power boosting. The base station signals to the user at least one of: the type of frequency domain pulse shaping filter to be used, the number of allocated subcarriers, the location of subcarriers in the time-frequency plane, the constellation rotation, and the modulation type. The frequency domain pulse shaping filter may use zero or non-zero excess bandwidth. The base station may schedule users such that the users with low signal-to-noise ratio user narrowband width, frequency domain pulse shaping with or without excess band width while the users scheduled in adjacent bands have high signal-to-noise ratio and possibly wider bandwidth allocation. Furthermore, the users may use overlapping set of subcarriers due to excess bandwidth employed at one or more users. At the base station receiver, the inter-user-interference caused by the non-orthogonal transmission may not give rise to significant interference because of the higher received power associated with the high signal-to-noise ratio users.

Figure 5:
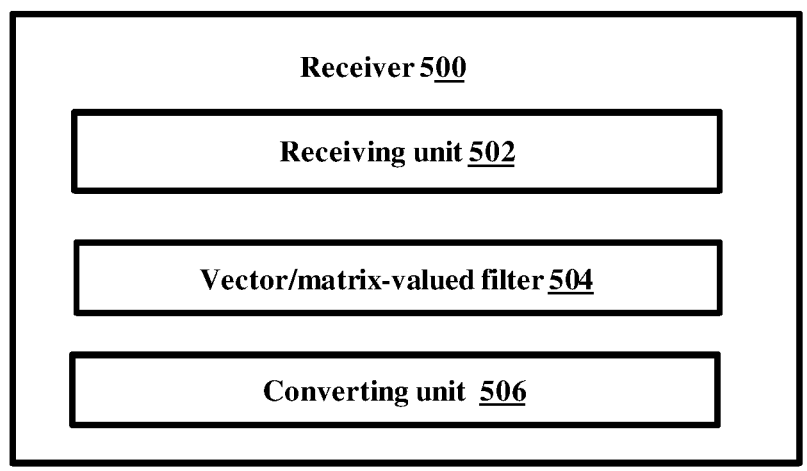
FIG. 5 is a block diagram of various hardware components present in a receiver, according to the embodiments as disclosed herein.

FIG. 5 is a block diagram of various hardware components present in a receiver 500, according to the embodiments as disclosed herein. The receiver 500 receives the data stream. The data stream is received in the form of waveform designed by the frequency domain pulse shaping filter 104. The receiver 500 includes receiving unit 502, a vector/matrix-valued filter 504, a converting unit 506, and an eliminating unit 508. A receiver front end operations such as sampling, synchronization, frequency offset removal, I/Q imbalance correction, DC offset correction, clock recovery, and CP (including cyclic prefix and/or suffix) removal and channel estimation operations are similar to a conventional receiver system. Further, the memory introduced by the propagation channel of any given user is assumed to be less than that of the CP duration. Furthermore, receiver obtains the overall channel impulse response using pilots and the knowledge of FDPSF.

The receiving unit 502 is configured to receive the data stream. After receiving the data stream, the vector/matrix-valued filter 504 is configured to suppress the ISI between the modulated data symbols in the data stream. Based on suppressing the ISI between the modulated data symbols in the data stream, the converting unit 506 is configured to convert the received data stream to time domain for detection of the signal.

In an embodiment, the eliminating unit 508 is configured to eliminate constellation rotation in the received data stream by de-rotating the received data stream in the frequency domain.

In an embodiment, the eliminating unit 508 is configured to eliminate constellation rotation in the received data stream by de-rotating the received data stream in the time domain. In an embodiment, the eliminating unit 508 is configured to eliminate the cyclic prefix and the cyclic suffix from the received data stream after de-rotating the received data stream.

The time domain sampled received signal after removing CP is given by $$y_t(n) = \sum_{i=1}^{u} s_{i,t}(n) \otimes h_{i,t}(n) + n_t(n)$$

$$n = \frac{-N}{2}, \ldots, \frac{N}{2} - 1$$

Here $s_{i,n}(n)$ corresponds to the sampled version of the analog signal for the $i^{th}$ user. The symbol $\otimes$ denotes linear convolution operation. The noise vector $n_t(n)$ is an i.i.d. complex-Gaussian random variable each with zero-mean and variance $$\frac{\sigma_n^2}{2}$$

per dimension. Note that $h_{i,t}(n)$ is assumed to be a time limited channel of the $i^{th}$ user. Taking the N-point two-sided DFT of yt(n), the proposed technique get $$\bar{y}(m) = \sum_{n=-\frac{N}{2}}^{N/2} y_t(n) e^{-j2\pi nm/M}, m = \frac{-N}{2}, \ldots, \frac{N}{2} - 1 \ldots 22$$

the proposed technique can write $\bar{y}(m)$ as $$\bar{y}(m) = \sum_{i=1}^{u} q_i(m-m_i)h_i(m)\tilde{x}_i(m) + n(m),$$

$$m = \frac{-N}{2}, \ldots, \frac{N}{2}-1 \ldots 23$$

Multi-User System Model:

For the purpose of developing a multi-user generalized MMSE receiver, the proposed techniques assume that a) all the users employ equal number of subcarriers i.e., Mi=M and b) the proposed techniques apply zero excess BW for the users located at the band edges i.e., $\overline{M}_1 = \overline{M}_2 = M$. The remaining users $\overline{M}_i = \overline{M}$ for i=2, 3, . . . , L-1. The proposed techniques have a total of u=L users where L takes a minimum value of 1. For this case $$m_i = (i-1)M - \frac{N-\overline{M}}{2}$$

for i=2, 3, . . . , L-1 and $$m_i = \frac{N-\overline{M}}{2}, m_L = (L-1)M - \frac{N-M}{2}$$

since the proposed method employ zero excess BW at the band edges. As an illustrative example, the proposed techniques restrict to the case where $\overline{M} \leq 3M$ i.e, the frequency domain pulse causes interference to a maximum of one user located on either side. The receiver 500 can easily generalized to the case where users apply arbitrary values of $\overline{M}_i$. Furthermore, here the proposed techniques assume that all N subcarriers are utilized for data transmission. In practice, the actual number of subcarriers is equal to Nu<N.

In (23), letting $$m = k + (i-1)M - \frac{N}{2}$$

for k=0, 1, . . . , M-1 and i=1, 2, . . . , L, let's have $$y(k+(i-1)M) = y\left(k+(i-1)M - \frac{N}{2}\right), k = 0, 1, \ldots, M-1,$$

$$i = 1, \ldots, L \text{ and}$$

-continued $$p_i(k+(i-1)M) = q_i\left(k - \frac{\overline{M}_i}{2}\right)h_i\left(k+(i-1)M - \frac{N}{2}\right),$$

$$k = 0, 1, \ldots, M-1, i = 1, \ldots, L$$

where $h_i(k)$ is the frequency domain channel for the $i^{th}$ user and $$\tilde{x}_i\left(k+(i-1)M - \frac{N}{2}\right) = x_i(k) \text{ for } i = 1, \ldots, L.$$

The proposed detector jointly detects all the L users simultaneously using the generalized MMSE-DFE receiver. The receiver 500 exploits the redundancy (excess BW) contained in the signal. Let us collect multiple copies of the received signals as $$\bar{y}(k) = \overline{H}(k)x(k) + \bar{n}(k) \text{ for } k=0, \ldots, M-1 \ldots 24$$

Where $$\bar{y}(k) = \begin{bmatrix} y(k) \\ y(k+M) \\ y(k+2M) \\ y(k+3M) \\ \vdots \\ y(k+(L-1)M) \end{bmatrix}$$

$$\bar{n}(k) = \begin{bmatrix} n(k) \\ n(k+M) \\ n(k+2M) \\ n(k+3M) \\ \vdots \\ n(k+(L-1)M) \end{bmatrix}$$

$$x(k) = \begin{bmatrix} x_1(k) \\ x_2(k) \\ x_3(k) \\ \vdots \\ x_L(k) \end{bmatrix}$$

and $\overline{H}(k)$ is given by $$\begin{bmatrix} p_1(k) & p_2(k) & 0 & 0 \ldots & 0 & 0 & 0 \\ 0 & p_2(k+M) & p_3(k+M) & 0 \ldots & 0 & 0 & 0 \\ 0 & p_2(k+2M) & p_3(k+2M) & p_4(k+2M) & 0 & 0 & 0 \\ \vdots & \vdots & \vdots & \vdots & \vdots & \vdots & \vdots \\ 0 & 0 & 0 & 0 & p_{L-2}(k+(L-2)M) & p_{L-1}(k+(L-2)M) & 0 \\ 0 & 0 & 0 & 0 & 0 & p_{L-1}(k+(L-1)M) & p_L(k+(L-1)M) \end{bmatrix}$$

where the proposed techniques illustrate the channel matrix for the case where a maximum of two users interfere with any given user. This scenario corresponds to the case where the excess BW employed by any user is less than 200%.

Multi-User Widely Linear Generalized MMSE Equalizer

In order to exploit the real-valued nature of modulation symbols, the receiver first removes the constellation rotation using frequency domain operations. The first step in the WL receiver is to de-shift the received signal by $$\frac{M}{4}$$

samples to render the modulation data to be a real-valued signal. Note that if M is not an integer multiple of 4, constellation de-rotation step need to be performed in time domain and then transform the signal to frequency domain. After shifting y⁻(k) by $$\frac{M}{4}$$

samples, the proposed techniques get:

$$\hat{y}(k)=\hat{H}(k)a(k)+\hat{n}(k) \qquad (25)$$

Where $$\hat{y}(k) = y\left(k \oplus \frac{M}{4}\right), \hat{H}(k) = \overline{H}\left(k \oplus \frac{M}{4}\right), \hat{n}(k) = \overline{n}\left(k \oplus \frac{M}{4}\right)$$

and the proposed techniques use the fact that $x_i$ $$\left(k \oplus \frac{M}{4}\right) = a_i(k).$$

Next, the receiver 500 applies complex conjugation and frequency reversal operations on ŷ(k) to obtain:

$$\hat{y}^*(M-k)=\hat{H}^*(M-k)a(k)+\hat{n}^*(M-k) \qquad (26)$$

Here a*(M−k)=a(k). Stacking (25) and (26) in column vector format $$\begin{pmatrix} \hat{y}(k) \\ \hat{y}^*(k) \end{pmatrix} = \begin{pmatrix} \widetilde{H(k)} \\ \hat{H}^*(M-k) \end{pmatrix} a(k) + \begin{pmatrix} \hat{n}(k) \\ \hat{n}^*(M-k) \end{pmatrix} \qquad (27)$$

In compact matrix form $$y(k)=H(k)a(k)+n(k) \qquad (28)$$

In the proposed WL GMMSE receiver, the received signal is filtered using a matrix-valued feed-forward filter W(k) to obtain: z(k)=W(k)y(k). Following the approach presented in [13],[14], the proposed techniques define error signal $$e(k)=\vec{z}(k)-a(k) \qquad (29)$$

This is written in time domain as $$e_t(l)=z_t(l)-a_t(l) \qquad (30)$$

Applying orthogonality principle [14]

$$E(e(k)y^\dagger(k))=0, \text{ for } k=0,1,\ldots,M-1 \qquad (31)$$

Substituting (29) in (31) and evaluating the expectation, the FFF can be expressed as $$W(k)=R_{ay}(k)R_{yy}^{-1})(k) \qquad (32)$$

Where $R_{ay}(k)=E(a(k)y^\dagger(k))=R_{aa}(k)H^\dagger(k)$ and $R_{yy}(k)=E(y(k)y^\dagger(k))=[H(k)R_{aa}(k)H^\dagger(k)+R_{nn}(k)]$ Here, $R_{aa}(k)=E(a(k)a^\dagger(k))=M\sigma_a^2 I$ and $R_{nn}(k)=E(n(k)n^\dagger(k))=M\sigma_n^2 I.$ The FFF can be expressed in alternative form as $$W(k) = R_{aa}(k)H^\dagger(k)[H(k)R_{aa}(k)H^\dagger(k)+R_{nn}(k)]^{-1} \qquad (33)$$

$$= [R_{aa}^{-1}(k)+H^\dagger(k)R_{nn}^{-1}(k)H(k)]^{-1}H^\dagger(k)R_{nn}^{-1}(k) \qquad (34)$$

Note that (36) follows from applying matrix inversion lemm. Let, $R_{ee}(k)=E(e(k)e^\dagger(k))$. Using the optimum FFF, the minimum MSE can be shown to be [13],[14]

$$R_{ee} = \frac{1}{M^2}\sum_{k=0}^{M-1} R_{ee}(k) = \frac{1}{M}\sum_{k=0}^{M-1} Q(k) \qquad (35)$$

where $Q(k)=[R_{aa}^{-1}(k)+H^\dagger(k)R_{nn}^{-1}H(k)]^{-1}$. The symbols of individual users are detected using $z_t(l)$ using standard slicing methods.

Conventional GMMSE Receiver

The WL GMMSE receiver design is designed by performing following steps:
Step 1: Removal of constellation as a first step is done for the special case of real constellations only. For complex-valued constellations, the system works with y(k) directly.
Step 2: Remarking here that for the special case of s=1, since there is no multi-user interference among the users, the proposed conventional or WL GMMSE receiver can be decoupled into multiple single user conventional or WL MMSE equalizers.

Using Conventional GMMSE receiver, the received signal (25) is filtered using a matrix-valued feed-forward filter W^(k) to obtain: ẑ(k)=(k)ŷ(k). The expressions for the FFF is given by $$\hat{W}(k)=[R_{aa}^{-1}(k)+\hat{H}^\dagger(k)R_{\tilde{n}}^{-1}(k)\hat{H}(k)]^{-1}\hat{H}^\dagger(k)R_{\tilde{n}}^{-1}(k) \qquad (36)$$

and the MMSE becomes $$R_{conv} = \frac{1}{M}\sum_{k=0}^{M-1}\left[R_{aa}^{-1}(k)+\hat{H}^\dagger(k)R_{\tilde{n}}^{-1}(k)\hat{H}(k)\right]^{-1} \qquad (37)$$

The noise covariance term $R_{\tilde{n}}(k)=M\sigma_n^2 I$.

For complex constellations, the conventional GMMSE receiver can be applied directly on y⁻(k) followed by a time domain constellation removal step after frequency domain equalization.

Conventional Single User Equalizer

The multi-user equalizer involves inversion of a channel matrix of size L×L. Furthermore, the multi-user user equalizer is applicable only to the case where $M_i=M$. The following method can be used to detect both real and complex constellations. In this case, the equalizer modifies the signal model $\bar{y}_i(k)$ where the elements of $\bar{y}_i(k)$ $$(A+BCD)^{-1}=A^{-1}+A^{-1}BC^{-1}+DA^{-1}B^{-1}DA^{-1}$$

are formed by appropriately collecting the subcarriers of interest. Assuming Mi be the allocated for the user, the received signal model $\bar{y}_i(k)$ can be modified as $$\bar{y}(k) = \begin{bmatrix} \vdots \\ y(k+(i-2)M_i) \\ y(k+(i-1)M_i) \\ y(k+(iM_i)) \\ \vdots \end{bmatrix} \bar{h}_i(k) = \begin{bmatrix} \vdots \\ p_i(k+(i-2)M_i) \\ p_i(k+(i-1)M_i) \\ p_i(k+(iM_i)) \\ \vdots \end{bmatrix}$$

$$\bar{n}_i(k) = \begin{bmatrix} \vdots \\ n_i(k+(i-2)M_i) \\ n_i(k+(i-1)M_i) \\ n_i(k+(i)M_i) \\ \vdots \end{bmatrix}$$

can be used to develop the single user equalizer. Using this, for the case of conventional signal model, the proposed techniques can rewrite $\bar{y}_i(k)$ as $$\bar{y}_i(k) = \bar{h}_i(k)a_i(k) + \sum_{i\ne j}\bar{h}_j(k)a_j(k) + \bar{n}(k), i=1,2,\ldots,L \quad (38)$$

where $h_i(k)$ is the $i^{th}$ column of $\bar{H}(k)$ with certain rows containing zeros in h⁻i(k) are eliminated. The received signal (38) is filtered using a vector valued feed-forward filter $\bar{w}_i(k)$ to obtain: $\bar{z}(k)=\bar{W}(k)\bar{y}_i(k)$ where $\bar{z}_i(k)$ is a scalar-valued frequency domain equalized signal for the $i^{th}$ user. Following the MMSE approach, the expression for FFF is given by:

$$\bar{w}_i(k)=[\sigma_{a_i}^2+\bar{h}_i^\dagger R_{i,\bar{n}}^{-1}(k)\bar{h}_i(k)]^{-1}h_i^\dagger(k)R_{i,\bar{n}}^{-1}(n) \quad (39)$$

Where, $$R_{i,n}(k) = \sum_{i\ne j}\bar{h}_j(k)\bar{h}_j^\dagger(k)\sigma_{a_j}^2 + \sigma_n^2 \quad (40)$$

where $\sigma_{ai}^2$ is the variance of the $i^{th}$ user data. The MSE for the $i^{th}$ user is given by $$\hat{r}_{i,ee} = \frac{1}{M}\sum_{k=0}^{M-1}[\sigma_{a_i}^2 + \bar{h}_i^\dagger(k)R_{i,\bar{n}}^{-1}(k)\bar{h}_i(k)]^{-1} \quad (41)$$

Taking the IDFT of $\bar{z}_i(k)$ gives the time domain decision variable for detecting $i^{th}$ user. The constellation de-rotation can be performed on $\bar{z}_i(k)$.

Single User WL Equalizer

The single user WL equalizer is designed by collecting the signal (38) and its complex-conjugate and reversed copy in a column format.

$$\begin{pmatrix} \bar{y}(k) \\ \bar{y}^*(M_i-k) \end{pmatrix} = \begin{pmatrix} \bar{h}_i(k) \\ \bar{h}_i^*(M_i-k) \end{pmatrix}a_i(k) + \sum_{j\ne i}\begin{pmatrix} \bar{h}_j(k) \\ \bar{h}_j^*(M_i-k) \end{pmatrix}a_j(k) + \begin{pmatrix} \bar{n}(k) \\ \bar{n}^*(M_i-k) \end{pmatrix}$$

In compact matrix form:

$$\tilde{y}(k) = \tilde{h}_i(k)a_i(k) + \sum_{i\ne j}\tilde{h}_j(k)a_j(k) + \tilde{n}(k) \quad (43)$$

The received signal (43) is filtered using vector-valued feed-forward filter $\tilde{w}_i(k)$ to obtain $\tilde{z}_i(k)=(k)\tilde{y}_i(k)$: where $\tilde{z}_i(k)$ is a scalar valued frequency domain equalized signal for the $i^{th}$ user. Following the MMSE approach, the expression for FFF is given by:

$$\tilde{w}_i(k)=[\sigma_{a_i}^2+\tilde{h}_i^\dagger(k)R_{i,\tilde{n}}^{-1}(k)\tilde{h}_i]^{-1}\tilde{h}_i^\dagger(k)R_{i,\tilde{n}}^{-1}(k) \quad (44)$$

where, $$R_{i,\tilde{n}}(k) = \sum_{i\ne j}\tilde{h}_j(k)\tilde{h}_j^\dagger(k)\sigma_{a_j}^2 + \sigma_n^2 \quad (45)$$

where $\sigma_{ai}^2$ is the variance of the $i^{th}$ user data. The MSE for the $i^{th}$ user is given by $$\hat{r}_{i,ee} = \frac{1}{M}\sum_{k=0}^{M-1}[\sigma_{a_i}^2 + \tilde{h}_i^\dagger(k)R_{i,\tilde{n}}^{-1}(k)\tilde{h}_i(k)]^{-1} \quad (46)$$

Taking the IDFT of $\bar{z}_i(k)$ gives the time domain decision variable for detecting ith user. The constellation de-rotation can be performed on $\tilde{z}_i(k)$.

Figure 6:
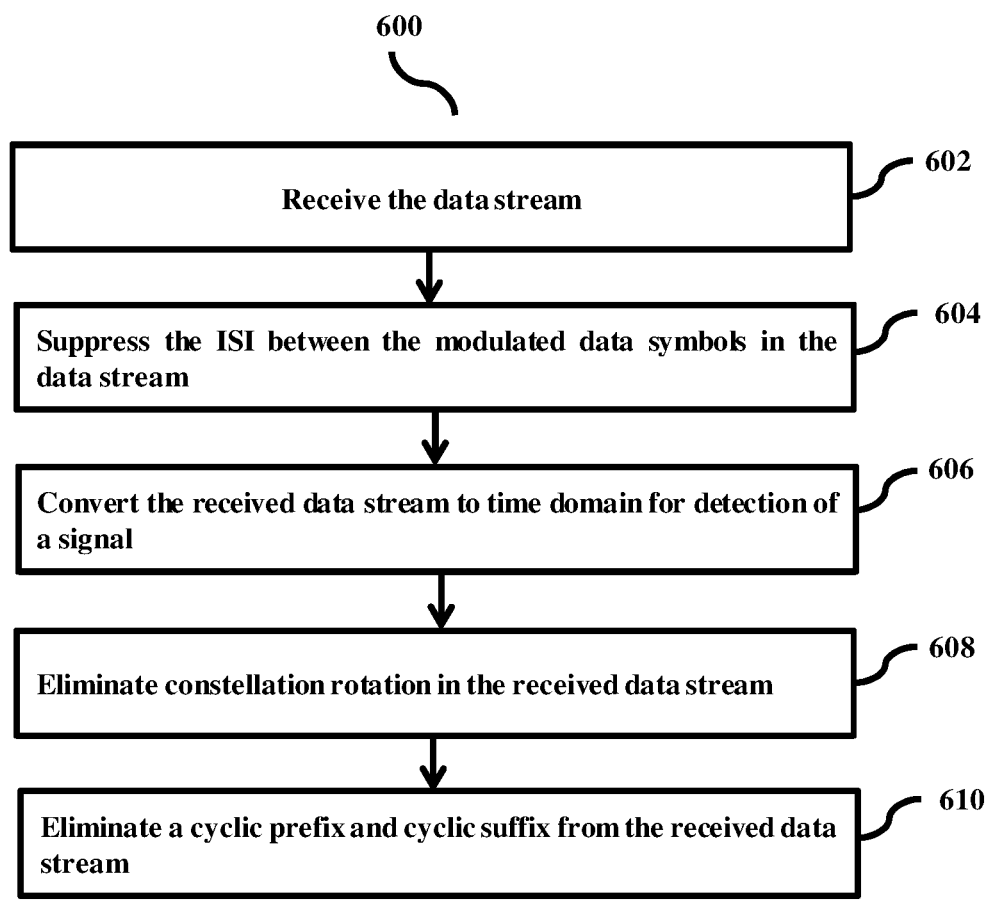
FIG. 6 flow diagram illustrating a method for processing a received data stream, according to the embodiments as disclosed herein.

FIG. 6 a flow diagram illustrating a method 600 for processing the received data stream, according to the embodiments as disclosed herein. At the step 602, the method 600 includes receiving the data stream. In an embodiment, the method 600 allows the receiving unit 502 to receive the data stream. In an embodiment, the data stream comprises the ISI between modulated data symbols of the data stream.

At the step 604, the method 600 includes suppressing the ISI between the modulated data symbols in the data stream. In an embodiment, the method 600 allows the vector/matrix-valued filter 504 to suppress the ISI between the modulated data symbols in the data stream.

At the step 606, the method 600 includes converting the received data stream to time domain for detection of a signal. In an embodiment, the method 600 allows the converting unit 506 to convert the received data stream to the time domain for detection of the signal after suppressing the ISI.

At the step 608, the method 600 includes eliminating the constellation rotation in the received data stream. At the step 610, the method 600 includes eliminating the cyclic prefix or cyclic suffix from the received data stream.

The various actions, acts, blocks, steps, and the like in method 600 may be performed in the order presented, in a different order or simultaneously. Further, in some embodiments, some actions, acts, blocks, steps, and the like may be omitted, added, modified, skipped, and the like without departing from the scope of the invention.

Figure 7:
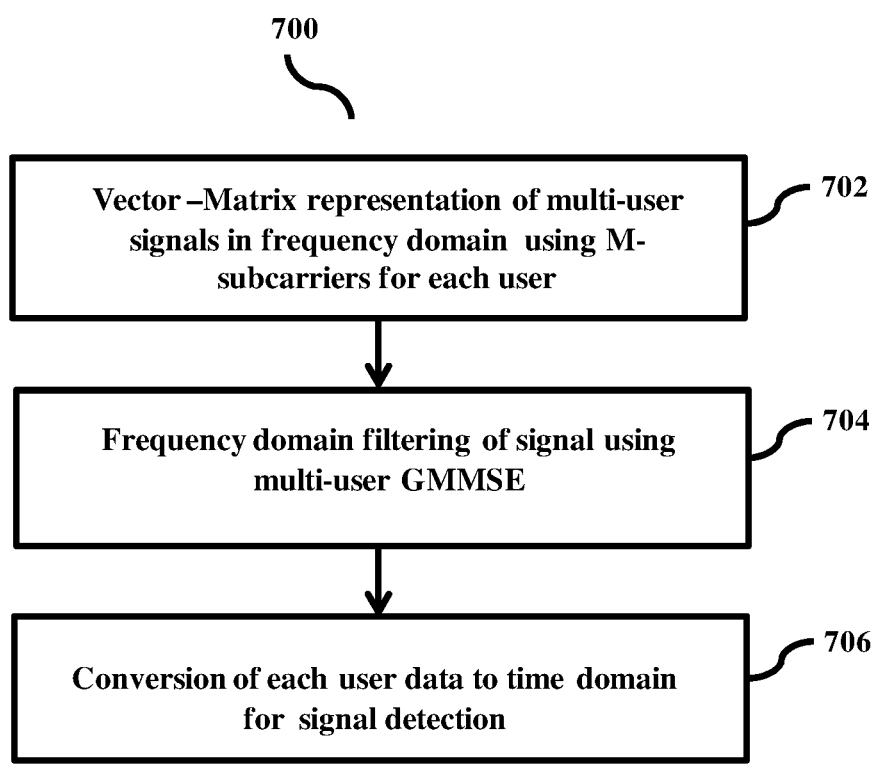
FIG. 7 shows the sequence of steps involved during signal reception in the GMMSE receiver design, according to the embodiments as disclosed herein.

FIG. 7 shows the sequence of steps involved during signal reception in the GMMSE receiver design. At the step 702, the method 700 includes providing a vector-matrix representation of multi-user signals in the frequency domain using the M-subcarrier for each user. At the step 704, the method 700 includes performing frequency domain filtering of signals using the multi-user GMMSE receiver after providing the vector-matrix representation of multi-user signals in the frequency domain. At the step 706, the method 700 includes converting, by the receiver, each user data to time domain for signal detection after performing frequency domain filtering of signals.

The various actions, acts, blocks, steps, and the like in method 700 may be performed in the order presented, in a different order or simultaneously. Further, in some embodiments, some actions, acts, blocks, steps, and the like may be omitted, added, modified, skipped, and the like without departing from the scope of the invention.

Figure 8:
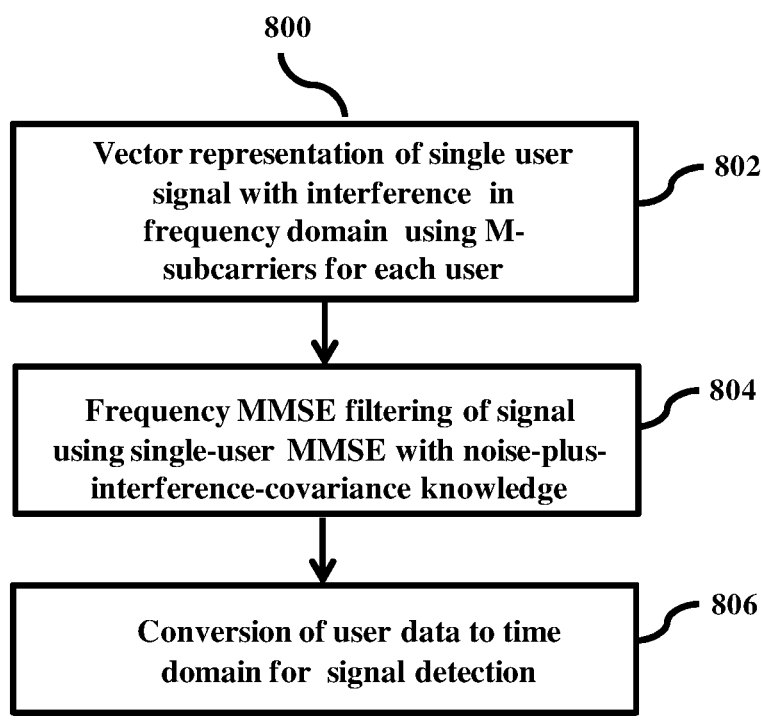
FIG. 8 shows the sequence of steps involved during signal reception the single user MMSE receiver design, according to the embodiments as disclosed herein.

FIG. 8 shows the sequence of steps involved in during signal reception the single user MMSE receiver design. At the step 802, the method 800 includes providing the vector-matrix representation of the single-user signals with the interference in the frequency domain using the M-subcarrier for each user. At the step 804, the method 800 includes performing the frequency MMSE filtering of signals using the single user MMSE receiver after providing the vector-matrix representation of the single-user signals with the interference in the frequency domain. At the step 806, the method 800 includes converting each user data to time domain for the signal detection after performing the frequency MMSE filtering of signals.

The various actions, acts, blocks, steps, and the like in method 800 may be performed in the order presented, in a different order or simultaneously. Further, in some embodiments, some actions, acts, blocks, steps, and the like may be omitted, added, modified, skipped, and the like without departing from the scope of the invention.

Figure 9:
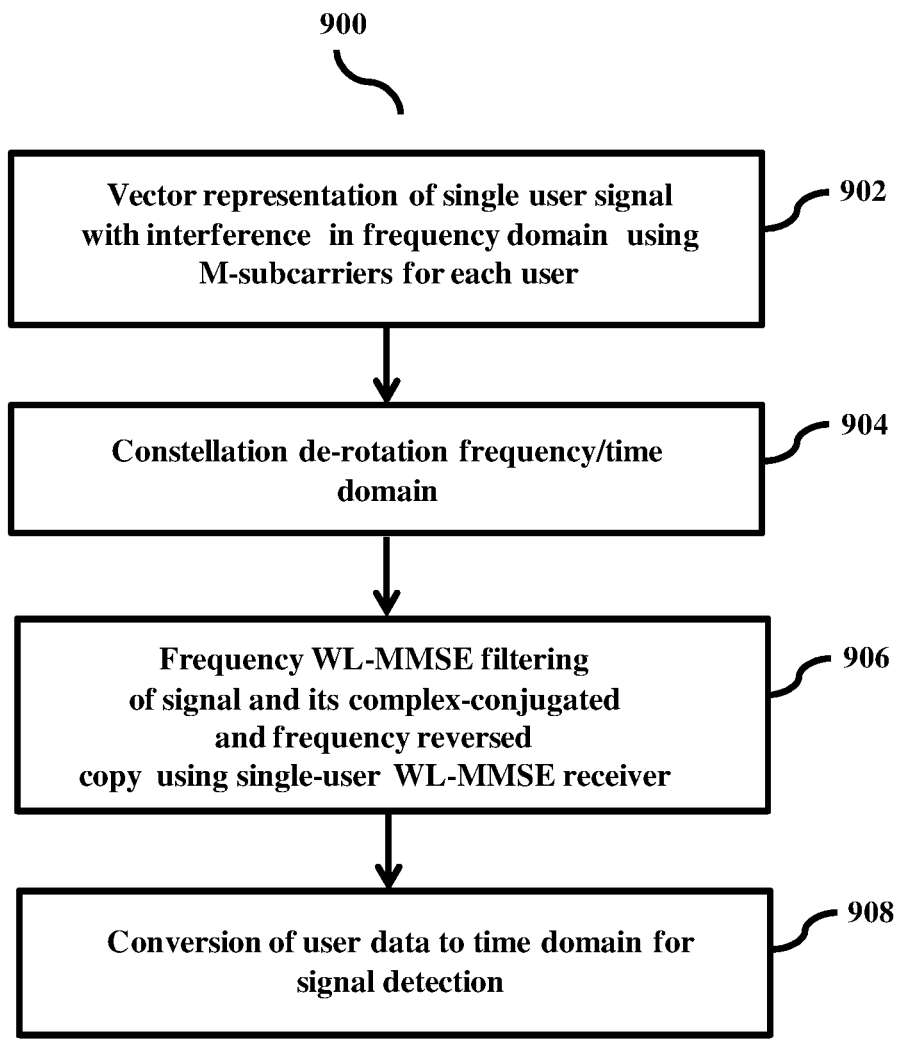
FIG. 9 shows the sequence of steps during signal reception in the single user WL MMSE receiver design, according to the embodiments as disclosed herein.

FIG. 9 shows the sequence of steps during signal reception in the single user WL MMSE receiver design. At the step 902, the method 900 includes providing the vector-matrix representation of single-user signal with interference in the frequency domain using the M-subcarrier for each user. At the step 904, the method 900 includes performing constellation de-rotation frequency/time domain after providing the vector-matrix representation of single-user signal with interference in the frequency domain. At the step 906, the method 900 includes performing frequency WL MMSE filtering of signals and it's conjugated and frequency reversed copy using single user WL MMSE receiver. At the step 908, the method 900 includes converting each user data to the time domain for the signal detection.

The various actions, acts, blocks, steps, and the like in method 900 may be performed in the order presented, in a different order or simultaneously. Further, in some embodiments, some actions, acts, blocks, steps, and the like may be omitted, added, modified, skipped, and the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for designing a waveform for data communication, the method comprising:
    applying, by a phase rotator, a constellation specific phase rotation between consecutive data symbols in a data stream to obtain a constellation rotated data stream;
    obtaining, by a repeater, a spread signal from the constellation rotated data stream in a frequency domain; and
    applying, by a controller, a frequency domain pulse shaping filter to the spread signal, wherein the frequency domain pulse shaping filter is obtained using a Discrete Fourier transform (DFT) of a sampled linearized Gaussian pulse.

2. The method of claim 1, comprising:
    computing, by the controller, a multi-point DFT of the constellation rotated data stream.

3. The method of claim 1, wherein the spread signal is obtained by repeating the constellation rotated data stream in the frequency domain.

4. The method of claim 1, wherein the DFT is a multi-point two-sided DFT of the sampled linearized Gaussian pulse, wherein the sampled linearized Gaussian pulse is obtained by sampling a linearized Gaussian pulse using an over-sampling factor.

5. The method of claim 4, wherein the multi-point two-sided DFT is computed based on the over-sampling factor and a number of the modulated data symbols.

6. The method of claim 4, wherein the oversampling factor is equal to one or greater than one.

7. The method of claim 1, wherein the frequency domain pulse shaping filter increases bandwidth of the spread signal when the over sampling factor is greater than one.

8. The method of claim 1, comprising:
    adding, by the controller, at least one of a cyclic prefix and a cyclic suffix to the data stream after performing an Inverse Fast Fourier transform (IFFT) is applied on the subcarrier mapped signal.

9. The method of claim 1, further comprising:
    adding, by the controller, at least one of a cyclic prefix and a cyclic suffix to the data stream after performing an IFFT; and
    converting, by a digital-analog converter, the data stream from a digital signal obtained from the IFFT to an analog signal after adding at least one of a cyclic prefix and a cyclic suffix.

10. The method of claim 8, comprising:
    applying, by a window applying unit, a window function on the data stream upon addition of at least one of the cyclic prefix and the cyclic suffix to the data stream.

11. The method of claim 1, wherein the data stream is mapped to one of a localized subcarrier and a distributed sub-carrier.

12. The method of claim 1, wherein the data stream is transmitted for multiple users occupying one of non-overlapping subcarriers, partially overlapping subcarriers, and fully overlapping subcarriers.

13. A transmitter for designing a waveform for data communication, the transmitter comprising:
- a phase rotator configured to apply a constellation specific phase rotation between consecutive data symbols in a data stream to obtain a constellation rotated data stream; and
- a repeater configured to obtain a spread signal from the constellation rotated data stream in a frequency domain;
- a controller configured to apply a frequency domain pulse shaping filter configured to the spread signal, wherein the frequency domain pulse shaping filter is obtained using a Discrete Fourier transform (DFT) of a sampled linearized Gaussian pulse.

14. The transmitter of claim 13, wherein the controller is configured to compute a multi-point Discrete Fourier Transform (DFT) of the constellation rotated data stream.

15. The transmitter of claim 13, wherein the spread signal is obtained repeating the constellation rotated data stream in a frequency domain.

16. The transmitter of claim 13, wherein the DFT is a multi-point two-sided DFT of the sampled linearized Gaussian pulse, wherein the sampled linearized Gaussian pulse is obtained by sampling a linearized Gaussian pulse using an over-sampling factor.

17. The transmitter of claim 16, wherein the multi-point two-sided DFT is computed based on the over-sampling factor and a number of the modulated data symbols.

18. The transmitter of claim 16, wherein the oversampling factor is equal to one or greater than one.

19. The transmitter of claim 13, wherein the frequency domain pulse shaping filter increases bandwidth of the spread signal when the over sampling factor is greater than one.

20. The transmitter of claim 13, wherein the controller is configured to add at least one of a cyclic prefix and a cyclic suffix to the data stream after performing an inverse Fast Fourier transform (IFFT) on the data stream.

21. The transmitter of claim 13, wherein the transmitter comprises:
- the controller further configured to add at least one of a cyclic prefix and a cyclic suffix to the data stream after performing an IFFT; and
- a digital-to analog signal converter configured to convert the data stream from a digital signal obtained from the IFFT to an analog signal after adding at least one of a cyclic prefix and a cyclic suffix.

22. The transmitter of claim 13, wherein the transmitter is configured to apply a window function on the data stream upon addition of at least one of the cyclic prefix and the cyclic suffix to the data stream.

23. The transmitter of claim 13, wherein the data stream is mapped to one of a localized subcarrier and a distributed sub-carrier.

24. The transmitter of claim 13, wherein the data stream is transmitted for multiple users occupying one of non-overlapping subcarriers, partially overlapping subcarriers, and fully overlapping subcarriers.

* * * * *